US010216739B2

(12) United States Patent
Broll et al.

(10) Patent No.: US 10,216,739 B2
(45) Date of Patent: Feb. 26, 2019

(54) ROW-BASED ARCHIVING IN DATABASE ACCELERATORS

(71) Applicant: International Business Machines Corporation, Armonk, NY (US)

(72) Inventors: Bjoern Broll, Boblingen (DE); Xiaohong Fu, Milpitas, CA (US); Ruiping Li, San Jose, CA (US); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/982,347

(22) Filed: Dec. 29, 2015

(65) Prior Publication Data
US 2017/0185604 A1    Jun. 29, 2017

(51) Int. Cl.
G06F 7/00 (2006.01)
G06F 17/30 (2006.01)
G06F 11/14 (2006.01)

(52) U.S. Cl.
CPC .... G06F 17/30073 (2013.01); G06F 11/1451 (2013.01); G06F 17/30292 (2013.01); G06F 17/30584 (2013.01)

(58) Field of Classification Search
CPC ................................................ G06F 17/30073
See application file for complete search history.

(56) References Cited

U.S. PATENT DOCUMENTS

| 6,654,830 | B1* | 11/2003 | Taylor | G06F 3/0601 |
| | | | | 709/203 |
| 8,515,916 | B2 | 8/2013 | Gong | |
| 8,782,013 | B1 | 7/2014 | Tovo | |
| 8,825,604 | B2 | 9/2014 | Draese et al. | |
| 2003/0212687 | A1* | 11/2003 | Gonos | G06F 11/1469 |
| 2013/0218843 | A1 | 8/2013 | Agrawal et al. | |
| 2014/0095443 | A1* | 4/2014 | Draese | G06F 17/30289 |
| | | | | 707/661 |
| 2015/0142749 | A1 | 5/2015 | Broll et al. | |

OTHER PUBLICATIONS

Stolze et al., "Seamless Integration of Archiving Functionality in OLTP/OLAP Database Systems Using Accelerator Technologies", printed on Sep. 9, 2015, pp. 383-402.
"Netezza", Wikipedia, the free encyclopedia, page last modified on May 13, 2015, <https://en.wikipedia.org/wiki/Netezza>, p. 1-3.
"SQL/MED", Wikipedia, the free encyclopedia, page last modified on Jun. 9, 2014, <https://en.wikipedia.org/wiki/SQL/MED>, p. 1.

* cited by examiner

*Primary Examiner* — Ajith Jacob
(74) *Attorney, Agent, or Firm* — Edward J. Wixted, III

(57) ABSTRACT

An indication of data of a first table in a first database is received. The data includes one or more rows of data. The indicated data is transferred from the first table in the first database component to a backup table in the same database component. The data is transferred from the backup table to a second table in a second database component.

9 Claims, 4 Drawing Sheets

```
SELECT *
FROM Customers
WHERE NOT EXISTS order_date > 1-July-1995
```

```
INSERT INTO Customers_backup_table
SELECT *
FROM old Customers
    DELETE FROM Customers
    WHERE NOT EXISTS order_date > 1-July-1995
```

ROW-BASED ARCHIVING IN DATABASE ACCELERATORS

BACKGROUND OF THE INVENTION

The present invention relates generally to the field of database management, and more particularly to database archiving.

A database is an organized collection of data in the form of schemes, tables, queries, reports, views and other objects. Access to the data of a database may be provided by a database management system consisting of an integrated set of computer software that allows users to interact with one or more databases and provides access to all of the data contained in the databases. A database management system is generally designed to allow operations for management such as the definition, creation, querying, update, and administration of databases.

Database archiving is the process of moving selected data that is less frequently used or changed, and are not expected to be changed in the future, from one database to another database for long-term retention from which the data can be retrieved if needed.

SUMMARY

Embodiments of the present invention include a method, computer program product, and system for row-based archiving in databases. In one embodiment, an indication of data of a first table in a first database is received. The data includes one or more rows of data. The indicated data is transferred from the first table in the first database component to a backup table in the same database component. The data is transferred from the backup table to a second table in a second database component.

DETAILED DESCRIPTION

Embodiments of the present invention recognize that the amount of data stored and processed by database systems is growing at an accelerating pace. Storing high amount of data on limited disk space can affect the performance of the database system, and additional disk space for storage servers is typically expensive.

Embodiments of the present invention recognize that current data archiving techniques suffer from various problems, often making data archive operations inefficient and time-consuming. For example, partition-based archiving approaches are cumbersome, or impossible, for users who intend to archive data within a partition. This may be the case where, for example, a business attempts to partition customers based on customer ID from a table, which would likely require a more fine-grained selection of rows to be archived.

Embodiments of the present invention provide techniques for row-based transfer of data between databases.

Figure 1:
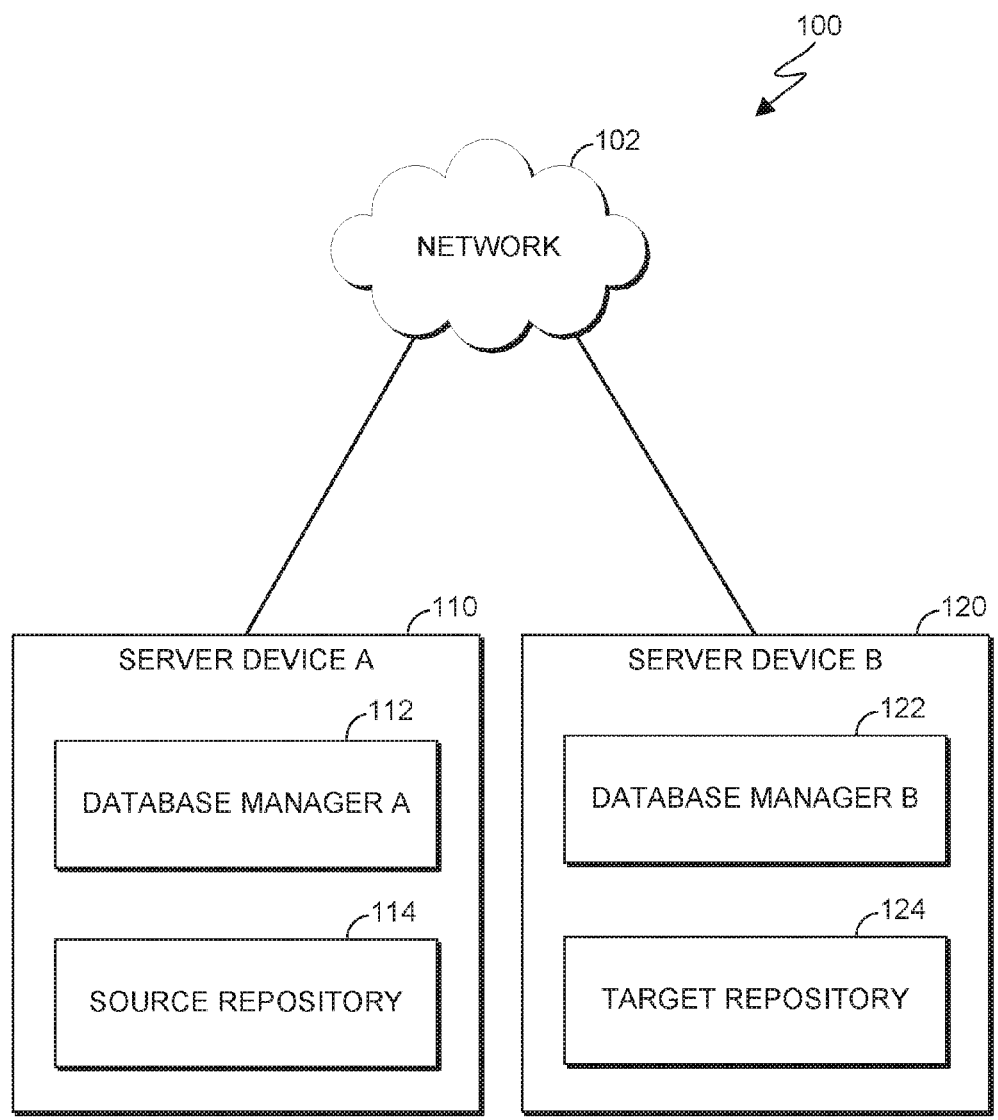
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In the illustrated embodiment, distributed data processing environment 100 includes server device A 110 and server device B 120. Server device A 110 and server device B 120 are interconnected through network 102. In an embodiment, distributed data processing environment 100 may additionally include any other computing device connected to network 102.

In an embodiment, network 102 may generally be any combination of connections and protocols that supports communications between server device A 110 and any other computing device connected to network 102. In example embodiments, network 102 may be a local area network (LAN), a telecommunications network, a wide area network (WAN), such as the Internet, or any combination thereof. In an embodiment, network 102 may include wired, wireless, or fiber optic connections.

In an embodiment, server device A 110 may generally be any electronic device or combination of electronic devices capable of executing computer readable program instructions. In example embodiments, server device A 110 may be a personal computer, workstation, mobile phone, or personal digital assistant. In an embodiment, server device A 110 may be a computer system utilizing clustered computers and components, such as database server devices or application server devices, that act as a single pool of seamless resources when accessed by elements of distributed data processing environment 100, such as in a cloud computing environment. Server device A 110 may include components as depicted and described with respect to FIG. 4, in accordance with embodiments of the present invention. In an embodiment, server device B 120 may be substantially similar to server device A 110.

In an embodiment, server device A 110 includes database manager A 112, source repository 114, and target repository 124. In an alternative embodiment, database manager A 112 may be located on any other computing device connected to network 102, and database manager A 112 may communicate with server device A 110 through network 102. In another alternative embodiment, source repository 114 may be located on any other computing device connected to network 102, and source repository 114 may communicate with server device A 110 through network 102. In an embodiment, database manager A 112, in general, is any computer program, application, subprogram of a larger computer program, or a combination thereof that provides functions for managing data stored in source repository 114, in accordance with embodiments of the present invention. In an embodiment, source repository 114, in general, contains data on which database manager A 112 may carry out operations (operational data), in accordance with embodiments of the present invention.

In an embodiment, database manager A 112 provides functions for managing data such as function to create, organize, store, retrieve, update, insert, delete, and otherwise manipulate data stored in source repository 114 or target repository 124. In an embodiment, database manager A 112 manages source repository 114 while database manager B 122 manages target repository 124. For example, database manager A 112 may create or update tables in source repository 114 or may transfer data among tables in source repository 114, and database manager A 112 may transfer data from a table in source repository 114 to database manager B 122, and database manager B 122 may store the data in target repository 124. A table may generally be data that is maintained within a database in a structured format using rows and columns.

In an embodiment, database manager A 112 performs operations on the data based on input from a user of server device A 110 or, alternatively, any other computing device (not shown) connected to network 102. In an embodiment, database manager A 112 may perform management operations according to queries, which may be expressed in a data manipulation language (DML), such as structured query language (SQL). In an embodiment, database manager A 112 may be implemented with a relational database management system such as IBM® DB2®.

In an embodiment, source repository 114 contains data on which operations may be performed by database manager A 112. In an embodiment, source repository 114 may be designed to support atomic, transactional processing of data (e.g., an online transaction processing (OLTP) database). In an embodiment, data in source repository 114 is organized as one or more tables. Tables in source repository 114 may or may not include partitions. A partition is a portion of a table that is treated as an independent unit by database manager A 112 and database manager B 122 during operations on data of the partition (i.e., either all of the data of a partition is utilized or none of the data of a partition is utilized).

In an embodiment, source repository 114 may be implemented using any non-volatile storage media known in the art. For example, source repository 114 may be implemented with a tape library, optical library, one or more independent hard disk drives, or multiple hard disk drives in a redundant array of independent disks (RAID). In an embodiment, source repository 114 may be implemented using any suitable storage architecture known in the art. For example, source repository 114 may be implemented with a relational database, an object-oriented database, or, alternatively, an object-relational database.

In an embodiment, server device B 120 includes database manager B 122 and target repository 124. In an alternative embodiment, database manager B 122 may be located on any other computing device connected to network 102, and database manager B 122 may communicate with server device B 120 through network 102. In another alternative embodiment, target repository 124 may be located on any other computing device connected to network 102, and target repository 124 may communicate with server device B 120 through network 102. In an embodiment, database manger B 122, in general, is any computer program, application, subprogram of a larger computer program, or a combination thereof that provides functions for managing data stored in target repository 124, in accordance with embodiments of the present invention. In an embodiment, target repository 124, in general, contains data to be stored with little or no alteration indefinitely (archived data), in accordance with embodiments of the present invention.

In an embodiment, database manager B 122 may provide functions to create, organize, retrieve, update, delete, and otherwise manage data stored in target repository 124. In an embodiment, database manager B 122 manages the data based on input from a user of server device B 120 or, alternatively, any other computing device (not shown) connected to network 102. For example, the input may be expressed in a data manipulation language (DML), such as structured query language (SQL). In an embodiment, database manager B 122 may utilize bulk operations (e.g., operations for manipulation of large amounts of data) to manage data in target repository 124. Where database manager B 122 utilizes bulk operations, database manager B 122 may apply bulk archive operations only to data of a partitioned table. In an embodiment, database manager B 122 may be integrated with database manager A 112. For example, database manager B 122 may be implemented with an IBM® DB2® Analytics Accelerator (IDAA) that is integrated with IBM® DB2® (i.e., database manager A 112, in an embodiment). In this case, database manager B 122 may act to provide efficient query processing of archived data stored in target repository 124.

In an embodiment, target repository 124 contains data on which operations may be performed by database manager B 122. In an embodiment, target repository 124 is designed to support analytical processing, and subsequent reporting, of data (e.g., an online analytical processing (OLAP) database). In an embodiment, target repository 124 contains data organized as one or more tables.

In an embodiment, target repository 124 may be implemented using any non-volatile storage media known in the art. For example, target repository 124 may be implemented with a tape library, optical library, one or more independent hard disk drives, or multiple hard disk drives in a redundant array of independent disks (RAID). In an embodiment, target repository 124 may be implemented using any suitable storage architecture known in the art. For example, target repository 124 may be implemented with a relational database, which may be a multidimensional database, an object-oriented database, or, alternatively, an object-relational database.

Figure 2:
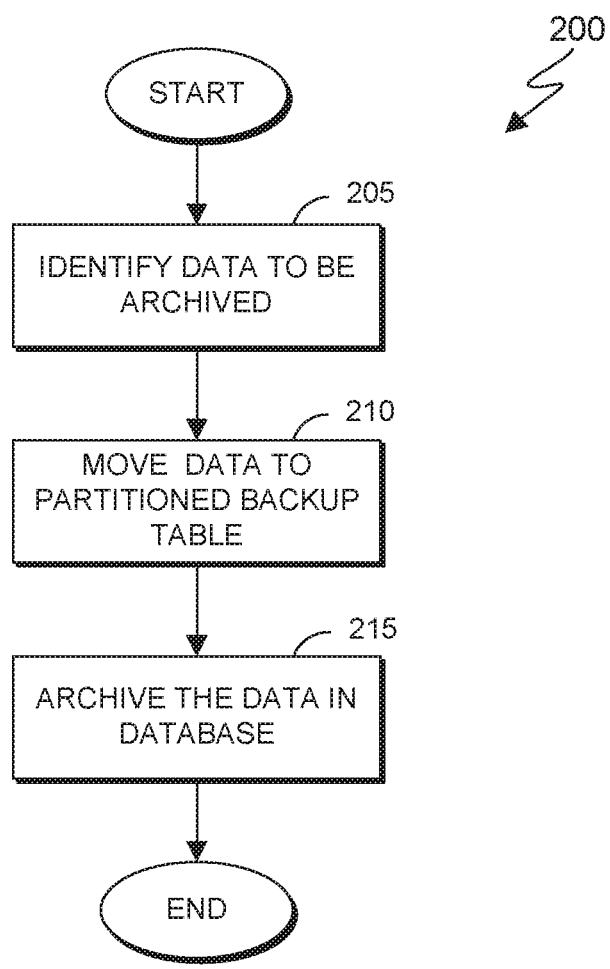
FIG. 2 is a flowchart of operational steps for providing row-based data storage management, in accordance with an embodiment of the present invention.

FIG. 2 is a flowchart of workflow 200 illustrating operational steps for providing row-based data storage management. In the illustrated embodiment, the steps of workflow 200 are performed by database manager A 112. In an alternative embodiment, the steps of workflow may be performed by any other computer program, or programs, while working with database manager A 112. In an embodiment, database manager A 112 begins performing the steps of workflow 200 in response to receiving an indication to begin providing row-based data storage management. For example, a user, through the user interface of server device A 110 (user interface not shown), may provide the indication to database manager A 112.

Database manager A 112 identifies data to be archived (step 205). In other words, in an embodiment, database manager A 112 receives a request to a move data from source repository 114 to target repository 124, and database manager A 112 identifies the data to be moved. In an embodiment, the identified data is organized as one or more rows of a table (source table) in source repository 114. In an embodiment, the request is received from a user through the user interface of a computing device (not shown) connected to network 102. In an embodiment, the request may be expressed as a query in a data manipulation language (DML), such as structured query language (SQL).

Figure 3A:
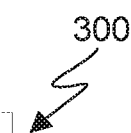
FIGS. 3A and 3B are diagrams of sample queries in structured query language, in accordance with an embodiment of the present invention.

As an example, source repository 114 may contain a table (titled Customers) of data corresponding to customers of a company. Each row of the table may contain data pertaining to a particular customer of a company, and the data may include categories such as customer ID, name of the customer, address of the customer, and date of the most recent purchase by the customer, where each data category is a column of the table. For this source table, database manager A 112 may receive sample SQL query A 300, as depicted in FIG. 3A. In response to the example query, database manager A 112 searches each row of customer data in the table Customers and identifies all the rows that do not indicate that an order has been recorded for a customer more recently than Jul. 1, 1995.

Database manager A 112 moves the data to a partitioned backup table (step 210). In other words, in an embodiment, database manager A 112 creates a partition in a backup table in source repository 114, removes the rows of data identified to be archived (identified in step 205) from the source table in source repository 114, and moves the rows to the partition in the backup table. In an embodiment, database manager A 112 moves (e.g., copies) the rows of data to the partition in the backup table according to a request received by database manager A 112. In an embodiment, the request may be expressed as a query in a data manipulation language (DML), such as structured query language (SQL).

Figure 3B:
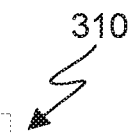

As an example, using the facts from the example query presented in step 205, database manager A 112 may receive sample SQL query B 310, as depicted in FIG. 3B. According to the example query, database manager A 112 concurrently removes the identified rows from the source table (Customers) and moves the identified rows to the backup table (Customers_backup_table).

In an embodiment, database manager A 112 creates a backup table and inserts the rows of data into the backup table in response to receiving a query to delete the rows of data from the source table. For example, where a setting in database manager A 112 is active (e.g., "MOVE_TO_ARCHIVE"), database manager A 112 may extend a DELETE SQL statement (e.g., sample SQL query B 310) to not only delete the selected data but to additionally insert the selected data into a backup table, which is associated with the source table. In an alternative embodiment, instead of utilizing a backup table, database manager A 112 may directly transfer the rows of data deleted from the source table to the target repository (performed in step 215).

Database manager A 112 archives the data in a database (step 215). In other words, in an embodiment, database manager A 112 utilizes database manager B 122 to move the data from the backup table in source repository 114 to storage in target repository 124 (e.g. into a target table in target repository 124). In an embodiment, database manager A 112 removes and purges (or deletes) the data from the backup table. In an embodiment, prior to moving the data to target repository 124 and purging the data from the backup table, database manager A 112 creates a backup copy (or image copy) of the data in the backup table, and database manager A 112 deletes the data from the backup table only after the image copy is made. Database manager A 112 may store the backup copy on non-volatile storage media (e.g., on hard disk, tape, etc.). The backup copy ensures that the data may be recovered in the event that the data is not successfully moved to target repository 124 (e.g., as a result of data loss, system failure, etc.).

In an embodiment, operational data may reside entirely in an operational database system (i.e., source repository 114 and database manager A 112) without requiring a copy of the operational data to be stored in the archive (or accelerator) database (i.e., target repository 124), and archived data (i.e., the data that has been moved from source repository 114 to target repository 124) may be stored entirely in target repository 124. As a result, in an embodiment, where database manager A 112 receives a query that involves only archived data (and not operational data), database manager A 112 may direct the query to be carried out entirely in the accelerator system (i.e., target repository 124 and database manager B 122).

In an embodiment, where a combined query is required (i.e., the query needs to involve operational data in source repository 114 as well as archived data in target repository 124), database manager A 112 may rewrite the query to involve both operational data and archived data (e.g., a "UNION ALL" operation). In this case, conventional federated query processing techniques may be utilized to optimize the query execution (e.g., enabling SQL predicates to be processed by the accelerator system).

In an alternative embodiment, a copy of the operational data may be stored in the archive database system (i.e., target repository 124 and database manager B 122) in addition to the operational data being stored in the operational database system. In an embodiment, where a combined query is required in such a case, database manager A 112 may rewrite the query to involve both operational data and archived data (e.g., a "UNION ALL" operation). In this case, however, conventional federated query processing techniques need not be utilized.

In an embodiment, where the "MOVE_TO_ARCHIVE" setting (or a similar setting) is active (discussed in step 210), database manager A 112 may automatically rewrite a query to combine the data from both tables (i.e., the source table and the backup table) where archived data should be considered (or seen) for a result set. In an embodiment, where data that is already archived should be considered in determining the result set, database manager A 112 may rewrite a query to combine the source table data (i.e., operational data), the backup table data, and the data in the archive system (i.e., archived data) in order to ensure all relevant data is considered in the query. In an embodiment, the rewrite requires that a special register is set (e.g., a "GET_ARCHIVE" register) in order to allow both archived and non-archived data to be accessed by database manager A 112 and database manager B 122.

Figure 4:
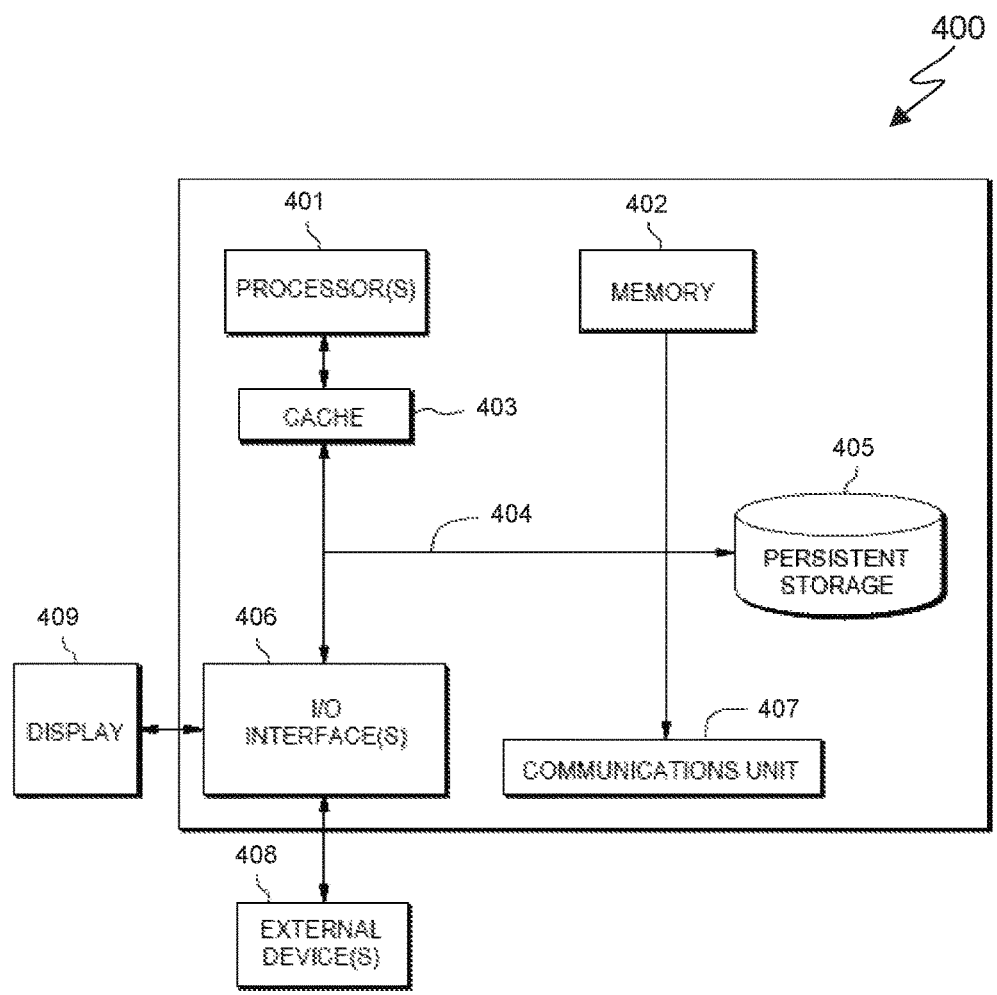
FIG. 4 is a block diagram of components of the server devices of FIG. 1, which includes database manager A 112 and database manager B 122, in accordance with an embodiment of the present invention.

FIG. 4 depicts computing system 400, which illustrates components of server device A 110, including database manager A 112, and server device B 120, including database manager B 122. Computing system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 may be implemented with one or more buses or a crossbar switch.

Memory 402 and persistent storage 405 are computer readable storage media. In an embodiment, memory 402 includes random access memory (RAM) (not shown). In general, memory 402 may include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 through I/O interface(s) 406. I/O interface(s) 406 also connect to display 409.

Display 409 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving a request to transfer a row of data from a source table of a source database system, to a target table of a target database system, wherein the row of data is a subset of a first partition of the source table and the target database system is an online analytical processing (OLAP) database;
   responsive to receiving the request:
      creating a second partition in an intermediate table of the source database system,
      transferring the row of data to the second partition,
      copying the row of data to a backup partition on a backup database system,
      storing an image copy of the backup partition,
      copying the second partition to the target table, to create an archive partition in the target table,
      deleting the row of data from the source table, and
      purging the second partition from the intermediate table of the source database system.

2. The method of claim 1, further comprising:
   receiving, by one or more computer processors, a query directed to the source table, wherein the query is received at the source database system, and wherein the query is a request to retrieve the row of data;
   querying, by one or more computer processors, the source table for the row of data; and
   responsive to not identifying the row of data in the source table, querying, by one or more computer processors, the target table for the row of data.

3. The method of claim 2, further comprising:
   responsive to not identifying the row of data in the target table, querying, by one or more computer processors, the image copy for the requested data.

4. A computer program product comprising:
   one or more computer readable storage media; and
   program instructions stored on the one or more computer readable storage media, the program instructions comprising:
      program instructions to receive a request to transfer a row of data from a source table of a source database system, to a target table of a target database system wherein the row of data is a subset of a first partition of the source table and the target database system is an online analytical processing (OLAP) database;
      responsive to receiving the request, program instructions to:
         create a second partition in an intermediate table of the source database system,
         transfer the row of data to the second partition,
         copy the row of data to a backup partition on a backup database system,
         store an image copy of the backup partition,
         copy the second partition to the target table, to create an archive partition in the target table,
         delete the row of data from the source table, and
         purge the second partition from the intermediate table of the source database system.

5. The computer program product of claim 4, further comprising program instructions, stored on the one or more computer readable storage media, to:
   receive a query directed to the source table, wherein the query is received at the source database system, and wherein the query is a request to retrieve the row of data;
   query the source table for the row of data; and
   responsive to not identifying the row of data in the source table, query the target table for the row of data.

6. The computer program product of claim 5, further comprising program instructions, stored on the one or more computer readable storage media, to:

responsive to not identifying the row of data in the target table, query the image copy for the requested data.

7. A computer system comprising:

one or more computer processors;

one or more computer readable storage media; and program instructions, stored on the one or more computer readable storage media, for execution by at least one of the one or more computer processors, the program instructions comprising:
    program instructions to receive a request to transfer a row of data from a source table of a source database system, to a target table of a target database system wherein the row of data is a subset of a first partition of the source table and the target database system is an online analytical processing (OLAP) database;
    responsive to receiving the request, program instructions to:
        create a second partition in an intermediate table of the source database system,
        transfer the row of data to the second partition,
        copy the row of data to a backup partition on a backup database system,
        store an image copy of the backup partition,
        copy the second partition to the target table, to create an archive partition in the target table,
        delete the row of data from the source table, and
        purge the second partition from the intermediate table of the source database system.

8. The computer system of claim 7, further comprising program instructions, stored on the one or more computer readable storage media, for execution by the at least one of the one or more computer processors, to:
    receive a query directed to the source table, wherein the query is received at the source database system, and wherein the query is a request to retrieve the row of data;
    query the source table for the row of data; and
    responsive to not identifying the row of data in the source table, query the target table for the row of data.

9. The computer system of claim 8, further comprising program instructions, stored on the one or more computer readable storage media, for execution by the at least one of the one or more computer processors, to:
    responsive to not identifying the row of data in the target table, query the image copy for the requested data.

\* \* \* \* \*